（12） United States Patent
Kita

(10) Patent No.: US 7,099,347 B2
(45) Date of Patent: Aug. 29, 2006

(54) SATELLITE COMMUNICATION SYSTEM

(75) Inventor: Tomohiro Kita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1083 days.

(21) Appl. No.: 09/876,107

(22) Filed: Jun. 8, 2001

(65) Prior Publication Data

US 2002/0021677 A1     Feb. 21, 2002

(30) Foreign Application Priority Data

Jul. 14, 2000    (JP)    .............................. 2000-213804

(51) Int. Cl.
    *H04J 4/00*    (2006.01)
(52) U.S. Cl. ...................... 370/436; 455/12.1; 455/427
(58) Field of Classification Search ................ 370/321, 370/322, 436
    See application file for complete search history.

(56) References Cited

U.S. PATENT DOCUMENTS 4,868,811 A * 9/1989 Suzuki ........................ 370/436
5,673,259 A   9/1997 Quick, Jr.

FOREIGN PATENT DOCUMENTS

| JP | 64-47136 | 2/1989 |
|---|---|---|
| JP | 01-180133 | 7/1989 |
| JP | 5-276080 | 10/1993 |
| JP | 6-164462 | 6/1994 |
| JP | 11-505392 | 5/1999 |
| JP | 2001-521330 | 6/2001 |
| WO | WO 99/21328 | 4/1999 |

* cited by examiner

*Primary Examiner*—Doris H. To
*Assistant Examiner*—Robert W. Wilson
(74) *Attorney, Agent, or Firm*—Oblon, Spivak, McClelland, Maier & Neustadt, P.C.

(57) ABSTRACT

Conventional satellite communication systems operated under DAMA system have such disadvantages that assignment of communication lines becomes time-consuming in case of transmitting small quantity of data many times and that data transmission is impossible in case of no available communication line, because the line assignment is performed by DAMA system for each individual demand for line assignment regardless of data quantity to be transmitted. The invention provides a satellite communication system in which the time required for assigning and securing a communication line can be shortened and communication lines can be utilized more efficiently, because of using single or plural common signal channel lines instead of using ordinary communication lines in case that data quantity is below a certain level.

5 Claims, 7 Drawing Sheets

SATELLITE COMMUNICATION SYSTEM

BACKGROUND OF THE INVENTION

1. Technical Field

The present invention relates to a satellite communication system operated under Demand Assignment Multiple Access system (hereinafter referred to as DAMA system) for the purpose of communications between a hub station and a plurality of remote stations, and in which common signal channel line (hereinafter referred to as CSC line) from remote stations to a hub station is used for data transmission.

2. Background Art

FIG. 5 is a schematic diagram showing an arrangement of one of conventional satellite communication systems operated under the DAMA system. DAMA system stands for a system in which a line required for communication is assigned on demand, in a communication network consisting of a plurality of earth stations. For that purpose, the DAMA system is provided with two types of lines, i.e., CSC line and communication line respectively. The CSC line is used for demanding assignment of a communication line and for controlling assignment of an idle line, and the assigned communication line is used for actual communication.

Referring to FIG. 5, reference numeral 31 is a hub station engaged in total control of a network including assignment, supervision and control of lines by the DAMA system, in the mentioned conventional satellite communication system. Numeral 32 is a plurality of remote stations, and numeral 33 is a communication satellite launched into space for relaying communication lines. Numeral 34 are forward CSC lines from the remote stations 32 to the hub station 31 through the communication satellite 33. In the operation of the DAMA system, the CSC lines 34 are used for transmission of demands for assignment of lines, supervisory signals and reply signals to the supervisory signals, or the like. Numeral 35 are backward CSC line from the hub station 31 to the remote stations 32 through the communication satellite 33. Numeral 36 is communication lines used for actual communications.

FIG. 6 is a diagram showing an arrangement of frequency band and time slots of the forward CSC line 34 and backward CSC line 35, fixed by the mentioned satellite communication system. Referring to FIG. 6, numeral 35 is a frequency band of the backward CSC line from the hub station 31 to the remote stations 32, and numeral 34 is a frequency band of the forward CSC line from the remote stations 32 to the hub station 31. Further, a different frequency band is allocated to the satellite communication lines 36, though not shown in FIG. 6.

FIG. 7 is a block diagram showing an arrangement of the conventional hub station 31. In the drawing, numeral 40 is a terminal unit. Numeral 41 is a line connection control device. This line connection control device 41 consists of: a DAMA control section 41a for detecting and assigning idle lines in response to demands for line assignment from the remote stations 32; and a supervision and control section 41b for transmitting supervisory signals to check whether or not the operation of remote stations is normal and receiving reply signals from the remote stations. Numeral 42 is a CSC modulator section for modulating radio signals such as instructions of line assignment from the line connection control device 41 to a frequency band of the backward CSC line 35. Numeral 43 is a CSC demodulator section for demodulating received signals corresponding to the frequency of the forward CSC line 34 shown in FIG. 6. Numeral 44a is a communication line modulator/demodulator (modem) section of the hub station 31 for establishing a frequency on an idle communication line for actual communication in accordance with instructions from the DAMA control section 41a, and for transmitting/receiving radio signals of the mentioned frequency. Numeral 45 is a transmitter/receiver for transmitting radio signals outputted from the CSC modulator 42 into space after amplifying the signals at the time of transmission and, and for converting radio signals received from the satellite 33 into intermediate frequency signals and outputting those signals to the CSC demodulator 43 at the time of reception.

FIG. 8 is a block diagram showing an arrangement of the conventional remote station 32. In the drawing, numeral 50 is a terminal unit. Numeral 51 is an IDU (In Door Unit). This IDU 51 consists of a CSC modulator/demodulator (modem) section 51a corresponding to the frequency of the forward CSC line 34, a communication line modulator/demodulator (modem) section 44b of the remote station 32 for establishing a frequency on an idle line at the time of communication and transmitting/receiving radio signals of the mentioned frequency, and an IDU control section 51c for controlling the CSC modulator/demodulator (modem) section 51a at the time of demanding a line, and for controlling the communication line modulator/demodulator (modem) section 44b so as to establish a frequency on an idle line in accordance with the instruction from the hub station 31 at the time of communication after the demand. Numeral 52 is an ODU (Out Door Unit) for transmitting into space radio signals outputted from the IDU 51 after amplifying those signals at the time of transmission, and for converting radio signals received from the satellite 33 into signals of an intermediate frequency and outputting those signals to the IDU 51, at the time of reception. Numeral 53 is an antenna.

The mentioned conventional system operates as described hereunder. First, in case of conducting a communication between a remote station 32a and another remote station 32b, the CSC modulator/demodulator (modem) section 51a of the remote station 32a modulates the frequency by the control of the IDU control section 51c to that of the forward CSC line 34 in response to a call from the terminal unit 50, and selects a time slot and transmits radio signals to the ODU 52 demanding a line connection (line assignment) to the hub station 31. The ODU 52 amplifies the mentioned radio signals and transmits them into space through the antenna 53.

The hub station 31 receives through the antenna 46 the signals demanding the line connection relayed through the satellite 33, and outputs the mentioned signals to transmitter/receiver 45. The transmitter/receiver 45 converts the signals demanding line assignment into intermediate frequency signals and outputs those signals to the CSC modulator/demodulator (modem) section 43. The CSC modulator/demodulator (modem) section 43 demodulates the signals demanding line connection and outputs them to the line connection control device 41. The DAMA control section 41a detects an idle communication line to be used for actual communication, and outputs a line assignment signal to the CSC modulator section 42. The mentioned signal is modulated at the CSC modulator 42, amplified at the transmitter/receiver 45, transmitted into space through the antenna 46, thus an available communication line (frequency and bandwidth to be used) is instructed to the remote stations 32a and 32b through the satellite 33.

Then, the remote stations 32a and 32b adjust the frequency of their respective modulator/demodulator (modems) sections 44b in tune with the instructed frequency band of the satellite communication line, and perform the communication. In case of conducting a communication between a remote station 32a and the hub station 31, the same steps as the foregoing are taken. That is, frequency of the communication line modulator/demodulator (modem) section 44a of the hub station 31 and that of the communication line modulator/demodulator (modem) section 44b of the remote station 32 are adjusted in tune with each other.

Supervision and control of each of the remote stations 32 by the hub station 31 is performed as described hereunder. The hub station 31 transmits a supervisory signal tuned to the frequency band of the backward CSC line 35 from the supervision and control section 41b into space through the CSC modulator 42, transmitter/receiver 45 and the antenna 46.

The supervisory signal received by a remote station 32 through the satellite 33 is modulated into an intermediate frequency at the ODU 52, demodulated at the CSC modulator/demodulator (modem) section 51a of the IDU 51, and then recognized as a supervisory signal destined to the remote station itself. At this time, if the remote station is normally operating, this remote station returns a reply signal to the hub station 31 through the CSC modulator/demodulator (modem) section 51a, the ODU 52 and the antenna 53, using the forward CSC line 34. The returned reply signal is recognized at the supervision and control section 41b in the line connection control device 41, whereby it is acknowledged that the remote station 32 is normally operating. The hub station 31 repeating the mentioned steps for each of the remote stations one after another conducts the supervision of all the remote stations 32.

In the mentioned conventional system, frequency bandwidth and information rate of the forward CSC line 34 were fixed at the time of demanding line connection and performing the supervision and control.

That is, in the foregoing prior art, the line assignment is performed regardless of data quantity to be transmitted. Since detection and assignment of a communication line is performed in response to each individual demand for line assignment, a problem exists in that in case of transmitting a small data quantity, the mentioned conventional communication system is time-consuming and inefficient. A further problem exists in that it is impossible to transmit data if there is no idle communication line.

SUMMARY OF THE INVENTION

The present invention was made to solve the above-discussed problems, and has an object of providing a satellite communication system in which in case that data quantity is below a certain level, a common signal channel line (CSC line) for data transmission is utilized instead of demanding, assigning and securing a communication line, thereby time from demanding data transmission until starting transmission being shortened without any need to assign and secure a communication line, more idle communication lines remaining available due to the use of the CSC line for data transmission, thus more efficient utilization of communication lines being achieved.

To accomplish the foregoing object, a satellite communication system according to the invention is operated under Demand Assignment Multiple Access system (DAMA system); in which a specific earth station performing line assignment control and a plurality of other earth stations are connected by a common signal channel line through a communication satellite; a calling earth station demands assignment of a communication line through the common signal channel line from the mentioned specific earth station at the time of performing a communication between the earth stations including the specific earth station; the mentioned specific earth station assigns a communication line in response to the demand for line assignment; and the calling earth station and the called earth station perform a communication using the mentioned assigned communication line, and release the communication line upon completing the communication;

the satellite communication system being characterized in that the mentioned common signal channel line is used for transmission of data whose quantity is below a certain level.

It is preferable that the mentioned plurality of other earth stations are provided with transmission band selection means for selecting a transmission bandwidth of the common signal channel line depending on data quantity to be transmitted from the mentioned earth stations.

It is also preferable that the mentioned plurality of other earth stations are provided with time slot selection means for selecting a plurality of continuous or discontinuous TDMA slots of the mentioned common signal channel line depending on data quantity to be transmitted from the mentioned earth stations.

It is also preferable that the mentioned plurality of other earth stations are provided with both transmission band selection means for selecting a transmission bandwidth of the common signal channel line depending on data quantity to be transmitted from the mentioned earth stations, and time slot selection means for selecting a plurality of continuous or discontinuous TDMA slots of the mentioned common signal channel line depending on the data quantity to be transmitted from the mentioned earth stations.

It is also preferable that in case of transmitting data to the mentioned specific earth station, the mentioned plurality of other earth stations demand transmission bandwidth and TDMA slots of the common signal channel line necessary for data transmission from the mentioned specific earth station, and the mentioned specific earth station assigns a transmission bandwidth and TDMA slots of the common signal channel line to the calling earth station to serve as exclusive communication line for the mentioned calling earth station.

In the satellite communication system of the foregoing arrangement, the time required for access to communication line can be shortened because of using the CSC line instead of assigning a communication line under DAMA system in case that data quantity to be transmitted is below a certain level. As a result, it becomes possible to obtain a satellite communication system in which efficient use of the communication line is improved.

Further, the time required for access to communication line can be shortened because of using the CSC line and making bandwidth and time slots of the CSC line variable, instead of assigning a communication line under DAMA system in case of transmitting a data quantity below a certain level. As a result, it becomes possible to obtain a satellite communication system in which efficient use of the communication line is improved.

Furthermore, by allocating temporarily single or plurality of time slots of the forward CSC line exclusively for data transmission of a specific remote station, it becomes possible to prevent data loss due to collision of different data being transmitted. As a result, it becomes possible to obtain a satellite communication system of high quality in which efficient use of the communication line is improved without communication line assignment under DAMA system.

DESCRIPTION OF THE PREFERRED EMBODIMENTS

Embodiment 1

Figure 1:
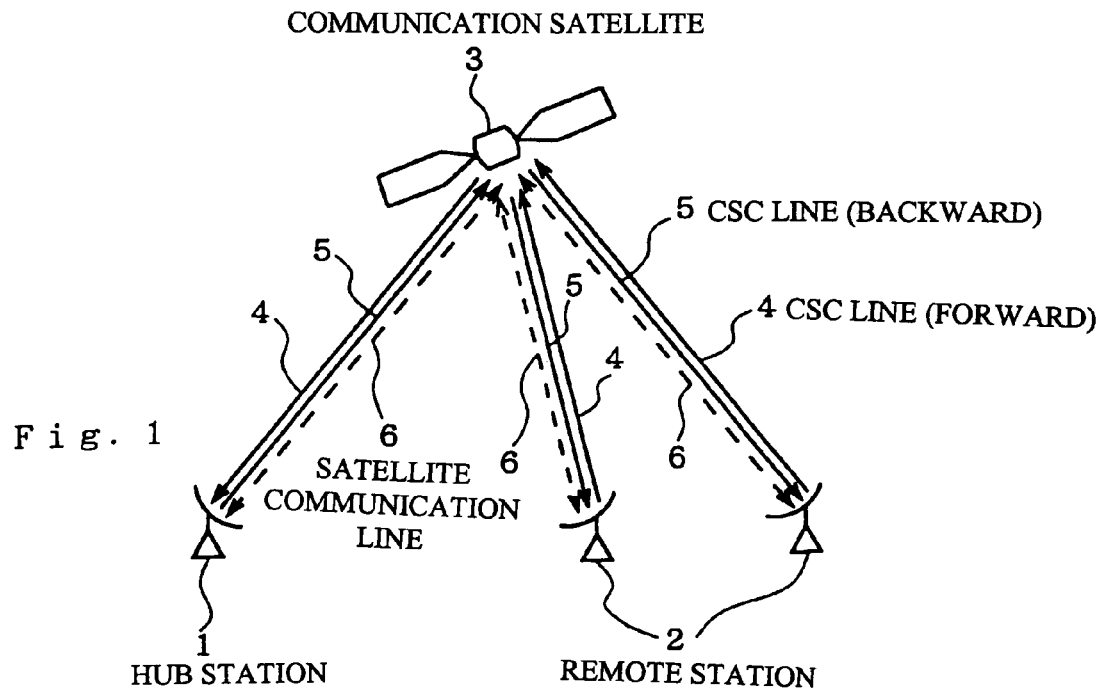
FIG. 1 is a schematic view showing an arrangement of a satellite communication system according to Embodiment 1 of the present invention.

FIG. 1 is a schematic view showing an arrangement of a satellite communication system according to Embodiment 1 of the present invention. In the drawing, reference numeral 1 is a hub station engaged in line assignment, supervision and control of a satellite communication system. Numeral 2 is a plurality of remote stations forming a network. Numeral 3 is a communication satellite launched into space for relaying satellite communication lines. Numeral 4 is an forward CSC line from the remote stations 2 to the hub station 1 through the communication satellite 3. Numeral 5 is a backward CSC line from the hub station 1 to the remote stations 2 through the communication satellite 3. Numeral 6 is a DAMA communication line through the communication satellite 3.

Figure 2:
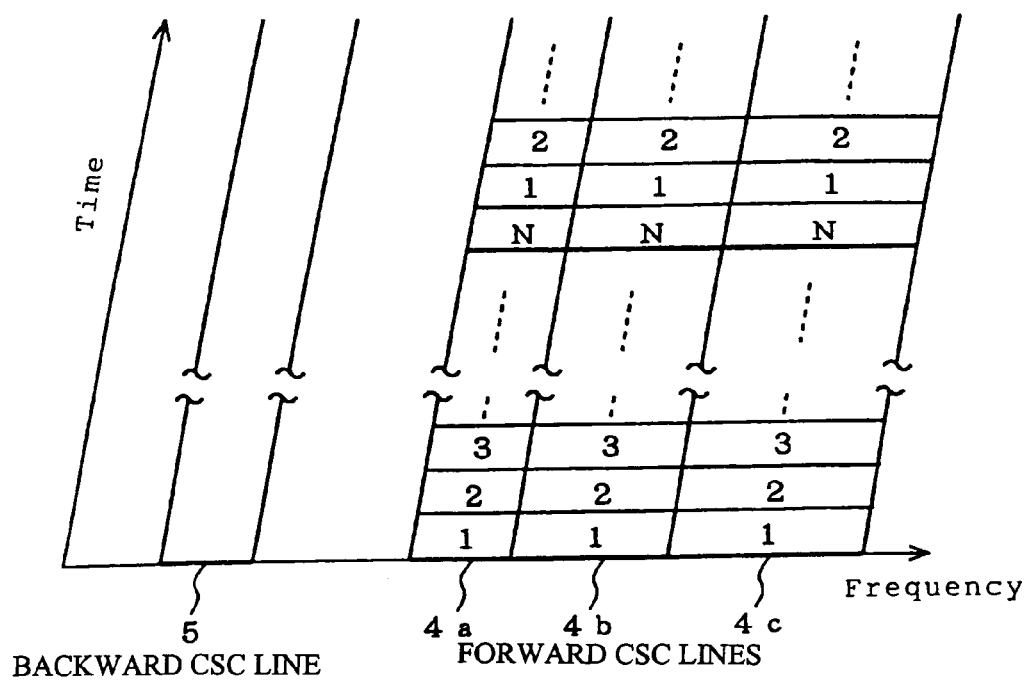
FIG. 2 is a schematic diagram showing an arrangement of frequency and time slots of a CSC line in the satellite communication system according to Embodiment 1 of the invention.

FIG. 2 is a schematic view showing an arrangement of frequency and time slots of the forward and backward CSC lines in a satellite communication system according to Embodiment 1 of the invention. In the drawing, numerals 4a, 4b and 4c show an arrangement of frequency of a plurality of forward CSC lines each different in bandwidth for transmission from the remote stations to the hub station. Numeral 5 shows an arrangement of frequency of the backward CSC line for transmission from the hub station to the remote stations. In case of the mentioned prior art, each of remote stations demands line assignment through a single forward CSC line. On the other hand, this Embodiment 1 is characterized in that the remote stations utilize a plurality of forward CSC lines each different in bandwidth as actual communication line, when the data quantity to be transmitted is small. In addition, a different frequency band is allocated to the satellite communication line 6 for actual communication, though not shown in FIG. 2.

Figure 3:
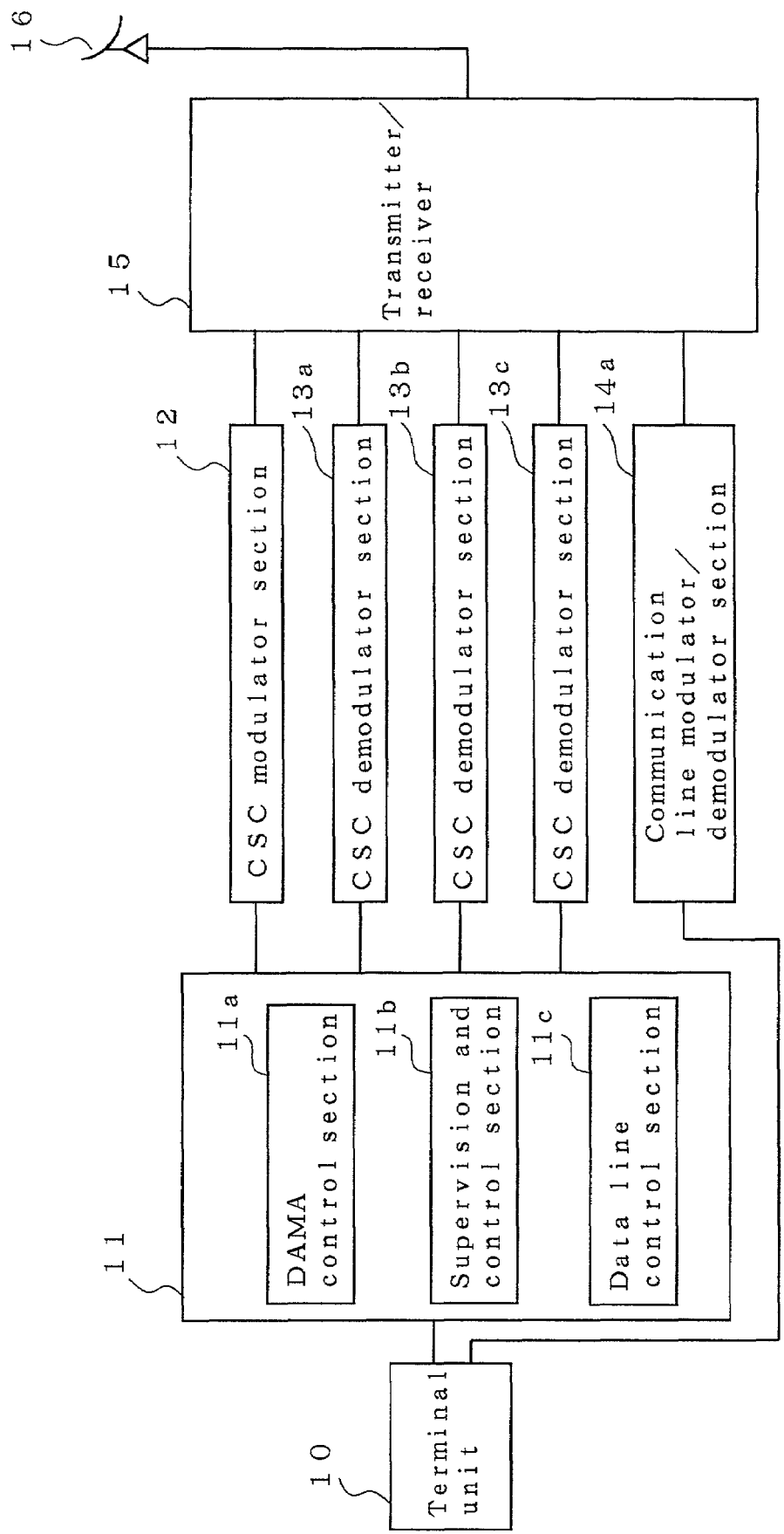
FIG. 3 is a block diagram showing an arrangement of a hub station in the satellite communication system according to Embodiment 1 of the invention.

FIG. 3 is a block diagram showing an arrangement of a hub station 1 in the satellite communication system according to Embodiment 1 of the invention. In the drawing, numeral 10 is a terminal unit. Numeral 11 is a line connection control device. This line connection control device 11 consists of: a DAMA control section 11a for detecting and assigning idle lines in response to demands for line assignment from the remote stations 2; supervision and control section 11b for transmitting supervisory signals to check operation of the remote station 2 and for receiving reply signals from the remote stations 2 to check whether or not the operation is normal; and data line control section 11c for identifying a destined earth station (including the hub station itself) of data transmitted through the CSC line of the invention, and for transmitting such data to the destined earth station (including the hub station itself).

Numeral 12 is a CSC modulator section for modulating instruction of line assignment from line connection control device 11 into a frequency band of the backward CSC line. Numeral 13a is a CSC demodulator section for demodulating signals of a frequency corresponding to the CSC line 4a in FIG. 2. Numerals 13b and 13c correspond to numerals 4b and 4c respectively. Numeral 14a is a communication line modulator/demodulator (modem) section for establishing a frequency on an idle communication line in accordance with instructions from the hub station, and for transmitting/receiving radio signals at the established frequency. Numeral 15 is a transmitter/receiver for amplifying radio signals outputted from the CSC modulator section 12 and transmitting the radio signals through an antenna 16 at the time of transmission, and for converting the radio signals received through the antenna 16 into a signal of intermediate frequency and outputting such signals to the CSC demodulator 13a, 13b and 13c at the time of reception.

Figure 4:
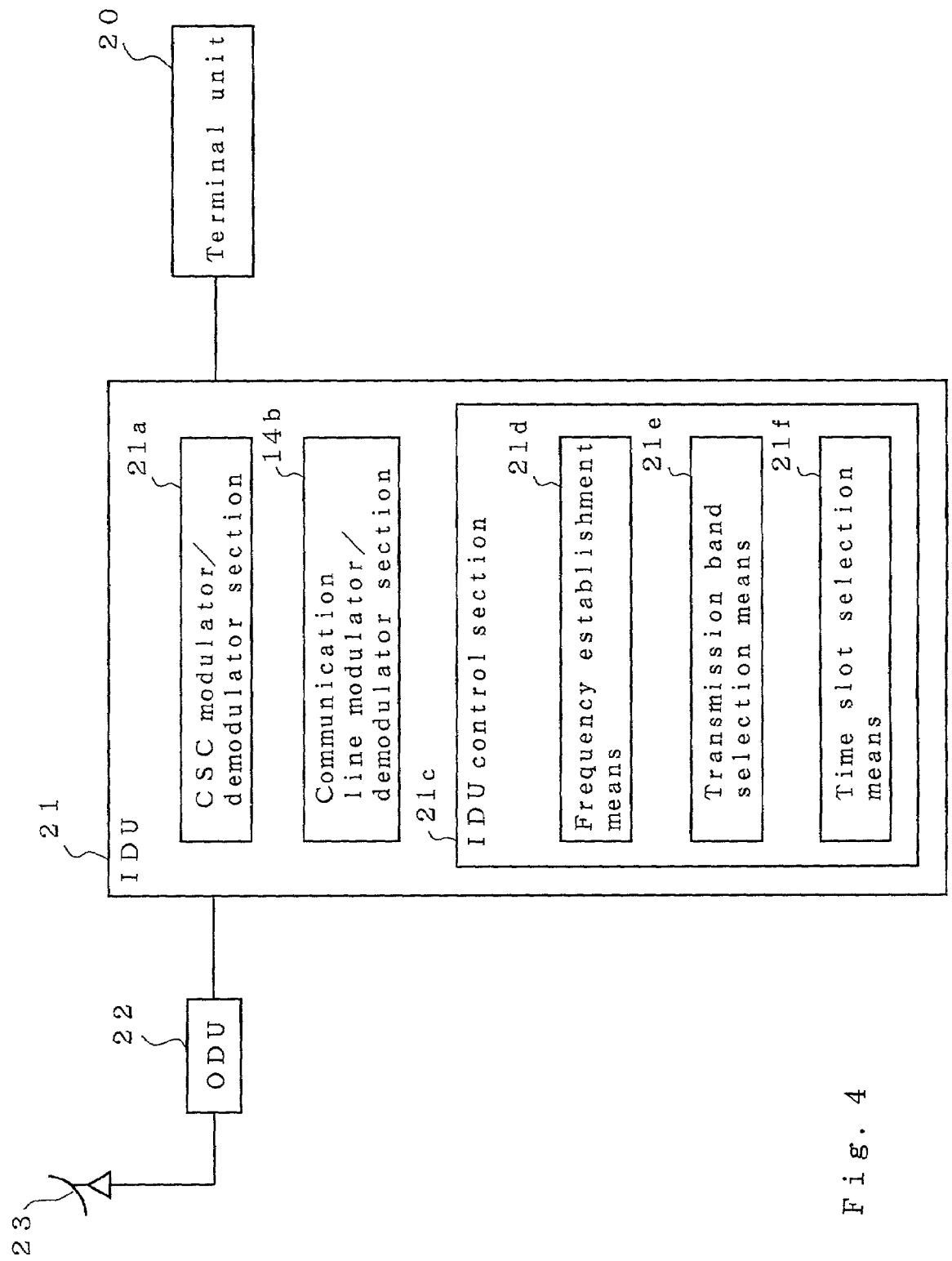
FIG. 4 is a block diagram showing an arrangement of a remote station in the satellite communication system according to Embodiment 1 of the invention.
Figure 5:
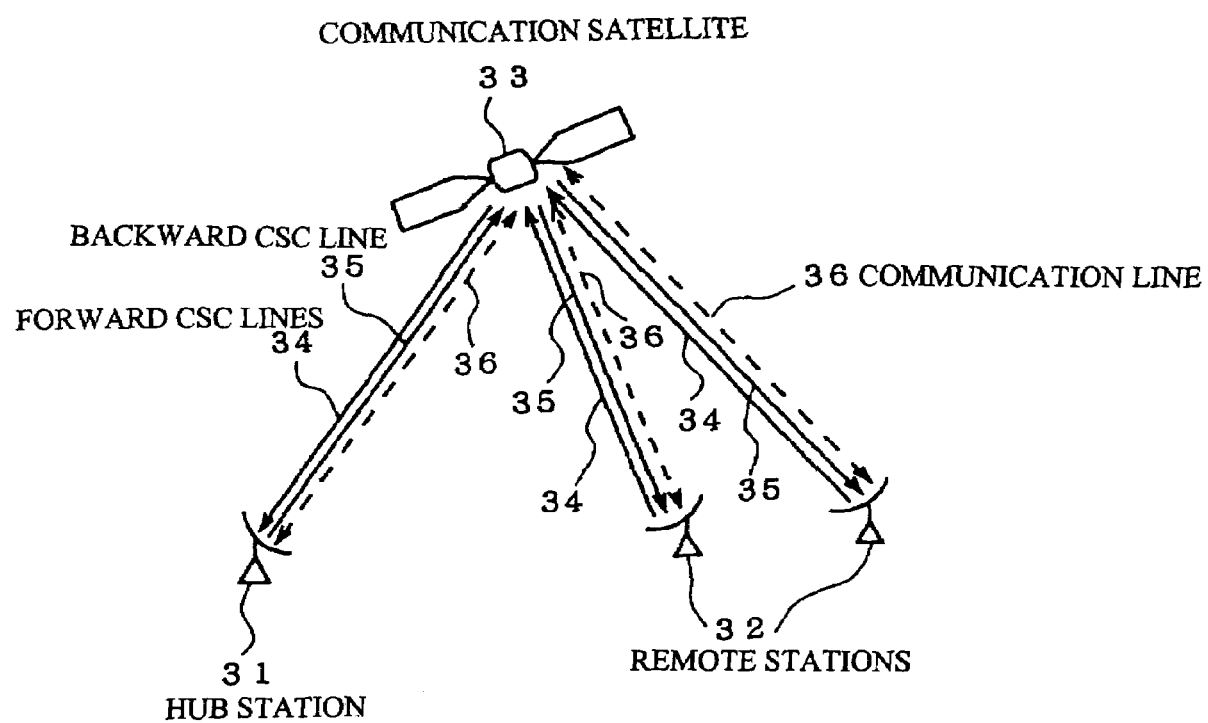
FIG. 5 is a schematic view showing an arrangement of a satellite communication system according to a prior art.
Figure 6:
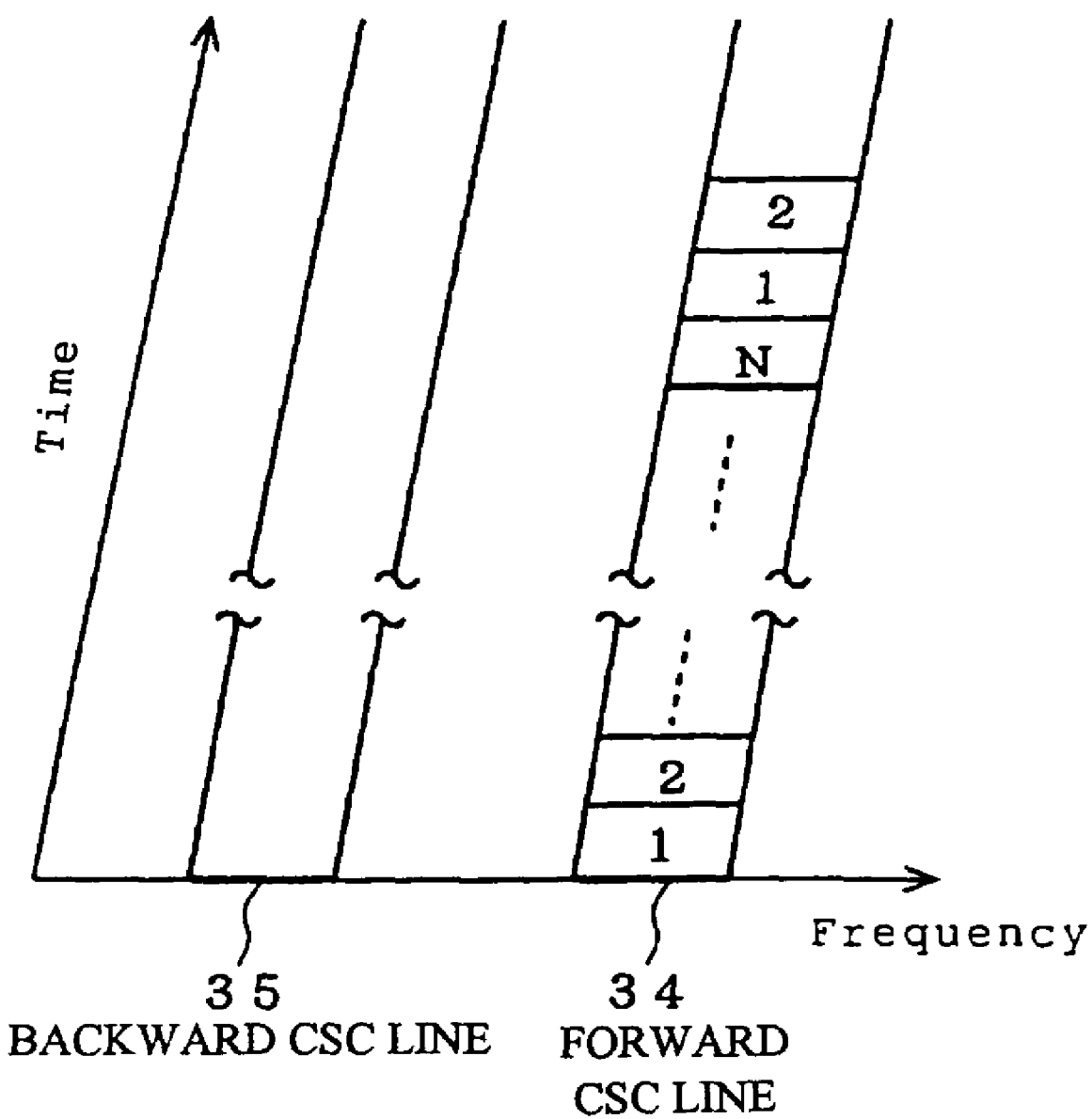
FIG. 6 is a schematic diagram showing an arrangement of frequency and time slots of a CSC line in the satellite communication system according to the prior art.
Figure 7:
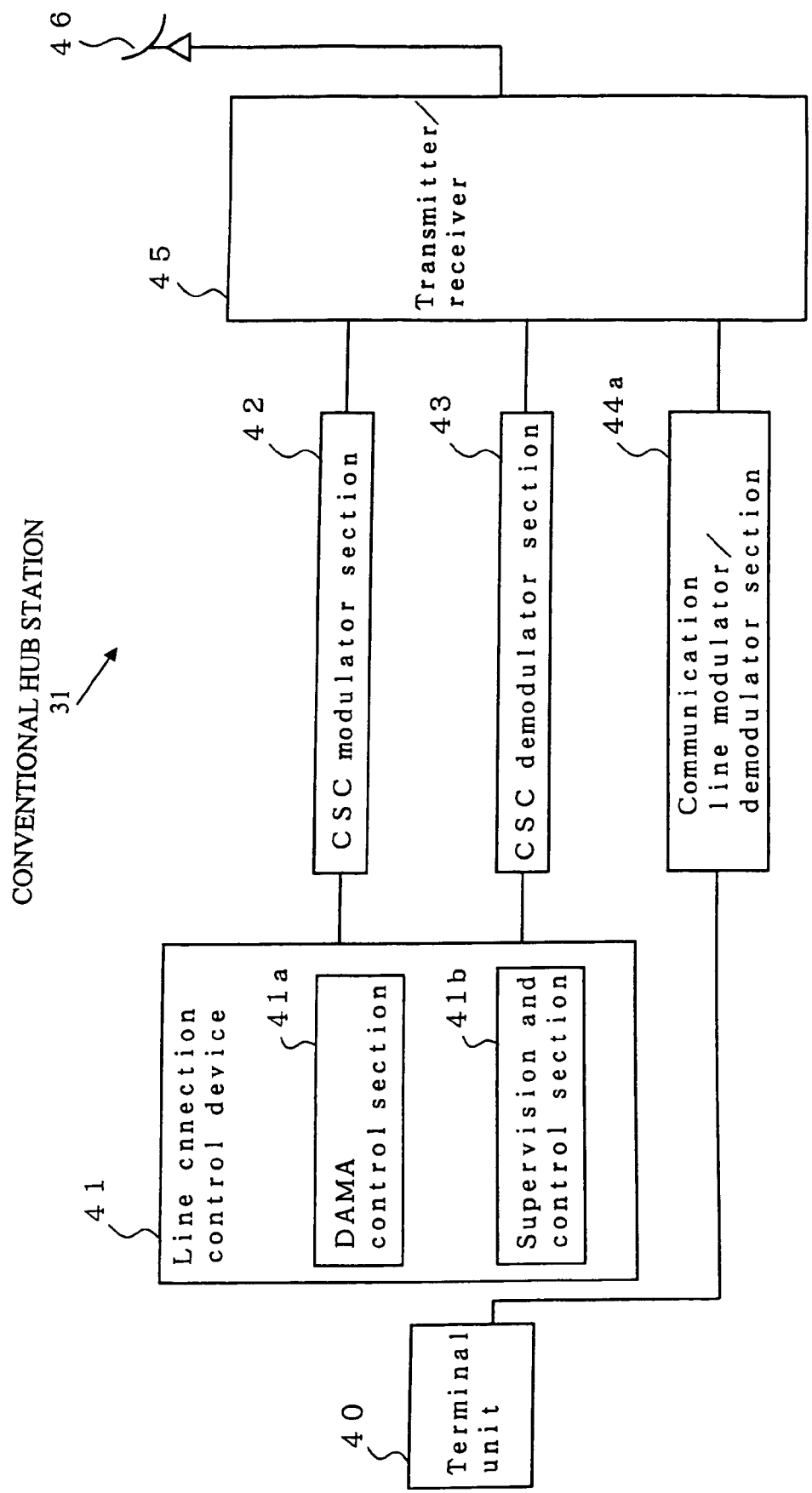
FIG. 7 is a block diagram showing an arrangement of a hub station in the satellite communication system according to the prior art.
Figure 8:
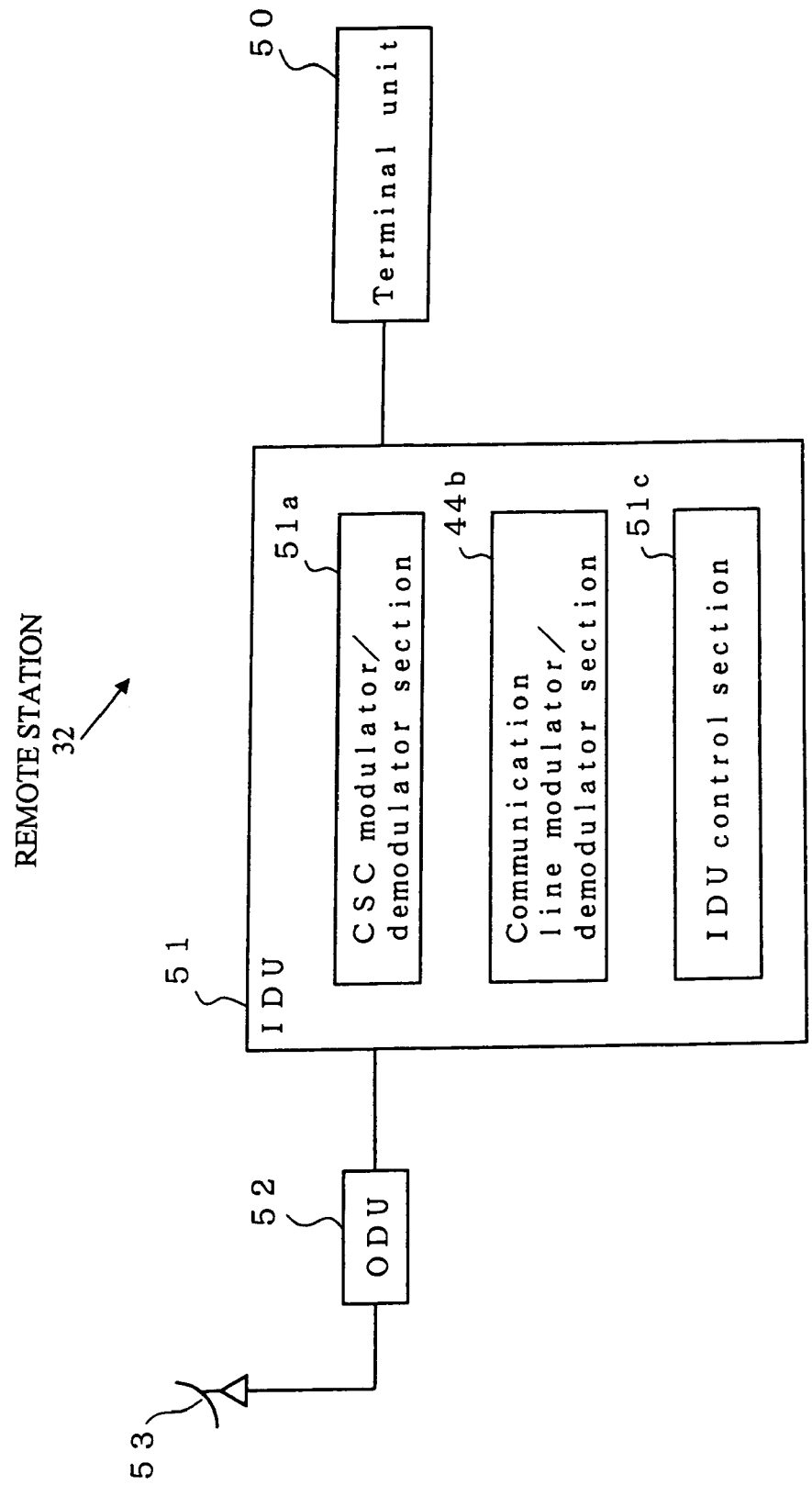
FIG. 8 is a block diagram showing an arrangement of a remote station in the satellite communication system according to the prior art.

FIG. 4 is a block diagram showing an arrangement of the remote station 2 in the satellite communication system according to Embodiment 1 of the invention. In the drawing, numeral 20 is a terminal unit. Numeral 21 is an IDU consisting of a CSC modulator/demodulator (modem) section 21a, a communication line modulator/demodulator (modem) section 14b and a control section 21c.

The mentioned control section 21c is provided with frequency establishment means 21d performing a conventional function of controlling the communication line modulator/demodulator (modem) section 14b so as to establish a frequency on an idle line in accordance with an instruction of line assignment from the hub station. Moreover, the mentioned control section 21c is provided with transmission band selection means 21e and time slot selection means 21f an additional performing a function of judging which of the forward CSC line or communication line is more suitable for transmission in view of the data quantity to be transmitted, and a function of selecting and establishing a frequency bandwidth, information rate and single or plural TDMA (Time division Multiple Access) time slots suitable for the data quantity, in case that the forward CSC line is chosen to be used.

Numeral 22 is an ODU for amplifying radio signals outputted from the IDU 21 and transmitting the signals into space at the time of transmission, and for converting radio signals received from the satellite 3 into intermediate frequency signals and outputting such signals to the IDU 21 at the time of reception. Numeral 23 is an antenna.

The satellite communication system of above arrangement operates as described hereunder. First, in the case that the remote station 2a transmits any data to the hub station 1, the control section 21c in the IDU 21 judges whether or not the data are within a quantity that can be transmitted through the forward CSC line. If the data quantity is judged transmittable, the most suitable forward CSC line is selected among the plurality of forward CSC lines 4a, 4b, 4c . . . each different in bandwidth, and the CSC modulator/demodulator (modem) section 21a is established on the selected channel. Then, the data is transmitted to the hub station 1 through single or a plurality of time slots (whether the time slots are continuous or discontinuous).

Upon receipt of the radio signals from the remote station 2 through the antenna 16, the hub station 1 converts the radio signals into signals of an intermediate frequency at the transmitter/receiver 15, and demodulates them at the CSC demodulator 13a, 13b or 13c corresponding to the frequency of the respective forward CSC lines. The demodulated data is transmitted to line connection control device 11. In this case, the mentioned DAMA control section 11a and the supervision and control section 11b are not involved, instead the data line control section 11c judges whether or not the data are destined to the hub station itself. If it is judged that the data are destined to the hub station itself, the data are outputted to the terminal unit 10.

If the data proves to be destined to the other remote station 2b, the data are transmitted 2b from the data line control section 11c to this remote station through the CSC modulator 12, transmitter/receiver 15 and the antenna 16.

When, for instance, the mentioned remote station 2b receives the data transmitted from the hub station 1, the control section of the IDU 21 judges whether or not the data is destined to the mentioned remote station itself. If it is judged that the data are destined to the remote station itself, the received data are transmitted to the terminal unit 20.

In this respect, for the purpose of connecting the communication line under DAMA system according to the prior art, following three steps are essentially required for data transmission among remote stations, for example from a remote station 2a to another remote station 2b:

1. Demanding line assignment from the remote station 2a to the hub station 1;
2. Assignment of a communication line by the hub station to remote stations 2a and 2b; and
3. Connection of the remote stations 2a and 2b through the assigned communication line.

However, in the arrangement disclosed in this Embodiment 1, the data transmission can be performed in following two steps:

1. From the remote station 2a to the hub station 1; and
2. From the hub station 1 to the remote station 2b.

As a result, by using the satellite communication system according to this Embodiment 1, the time before starting data transmission can be shortened on condition that the data quantity is below a certain level, and therefore the communication lines can be utilized more efficiently since the communication lines are not occupied for transmission of small sized data. When any data are larger than a data quantity (size) that can be transmitted by a single burst, such large data can be divided into plural bursts for transmission. In case of data excessively large to transmit even in plural bursts, it is more efficient to use ordinary DAMA system without intermediation of the hub station 1 and to use communication lines to connect the remote stations to each other directly.

Up to what data quantity (size) the satellite communication method according to this Embodiment 1 can be advantageously used, must be determined depending on specifications of individual systems, considering bandwidth of forward CSC line and other specifications including methods of error correction and decoding, methods of data compression and expansion, etc.

Embodiment 2

In this Embodiment 2, arrangement of time slots and devices are the same as those in the foregoing Embodiment 1.

The foregoing Embodiment 1 discloses a method for transmitting data from the remote station 2 to the hub station 1 in one or more bursts through the forward CSC line in case that the data quantity is below a certain level. It is, however, also possible to temporarily allocate an appropriate time slot of the forward CSC line exclusively for data transmission conducted by a specific remote station 2, thus preventing data loss caused by collision of different data.

More specifically, the control section 21c in the IDU 21 of the remote station 2 judges whether or not the data are within a data quantity that can be transmitted through the forward CSC line. If the data quantity is judged transmittable, the most suitable forward CSC line and time slot are selected among a plurality of forward CSC lines 4a, 4b, 4c . . . , and approval for exclusive use of the selected channel is requested to the hub station 1. In this operation, the time slot to be selected can be either continuous or discontinuous.

Upon receipt of the mentioned request, the DAMA control section 11a of the line connection control device 11 of the hub station 1 judges whether or not exclusive use of the forward CSC line 4 and the time slot is feasible. If it is judged feasible, control signals announcing exclusive use by the remote station 2a are transmitted to all the remote stations 2.

As has been described so far, in the satellite communication system according to the invention, data loss caused by collision of data is prevented by securing an exclusive forward CSC line for a specific earth station, and the communication lines can be efficiently utilized because of using a CSC line instead of securing a communication line by DAMA system for transmission of small data quantity.

What is claimed is:

1. A demand assignment multiple access satellite communication system, comprising:
   a specific earth station configured to perform line assignment control;
   a plurality of other earth stations configured to be connected to said specific earth station by a common signal channel line through a communication satellite;
   a calling earth station, selected from one of the plurality of said other earth stations, configured to demand assignment of a communication line by transmitting a request to said specific earth station through said common signal channel line, wherein
   said specific earth station assigns a communication line in response to the demand for line assignment, and said calling earth station and a called earth station perform a communication using said assigned communication line and release said communication line upon completing the communication; and
   said plurality of other earth stations are configured to transmit data to said specific earth station over the common signal channel line without requesting a communication line when said plurality of other earth stations determine that a quantity of data to be transmitted is below a predetermined threshold.

2. The satellite communication system according to claim 1, wherein
   said plurality of other earth stations are configured to select a transmission bandwidth of said common signal channel line depending on data quantity to be transmitted from said earth stations.

3. The satellite communication system according to claim 1, wherein
said plurality of other earth stations are configured to select a plurality of continuous or discontinuous TDMA slots of said common signal channel line depending on data quantity to be transmitted from said earth stations.

4. The satellite communication system according to claim 1, wherein
said plurality of other earth stations are configured to select a transmission bandwidth of the common signal channel line depending on data quantity to be transmitted from said earth stations, and configured to select a plurality of continuous or discontinuous TDMA slots of said common signal channel line depending on the data quantity to be transmitted from said earth stations.

5. The satellite communication system according to claim 1, wherein
when transmitting data to said specific earth station, said plurality of other earth stations are configured to demand transmission bandwidth and TDMA slots of the common signal channel line necessary for data transmission to said specific earth station, and said specific earth station are configured to assign a transmission bandwidth and TDMA slots of said common signal channel line to the calling earth station to serve as exclusive communication line for said calling earth station.

* * * * *